(12) United States Patent
Lewin et al.

(10) Patent No.: US 10,060,786 B2
(45) Date of Patent: Aug. 28, 2018

(54) MULTIPLEXED FIBER SENSOR

(71) Applicant: QINETIQ LIMITED, Farnborough Hampshire (GB)

(72) Inventors: Andrew Charles Lewin, Leigh Sinton (GB); Martin James Cooper, Malvern (GB); David Arthur Orchard, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 15/543,553

(22) PCT Filed: Jan. 14, 2016

(86) PCT No.: PCT/EP2016/050671
§ 371 (c)(1),
(2) Date: Jul. 13, 2017

(87) PCT Pub. No.: WO2016/113352
PCT Pub. Date: Jul. 21, 2016

(65) Prior Publication Data
US 2018/0003552 A1  Jan. 4, 2018

(30) Foreign Application Priority Data
Jan. 14, 2015 (GB) .................................. 1500596.0

(51) Int. Cl.
*G01D 5/353* (2006.01)
*G01H 9/00* (2006.01)
(Continued)

(52) U.S. Cl.
CPC ......... *G01H 9/004* (2013.01); *G01D 5/35325* (2013.01); *G02B 6/4213* (2013.01);
(Continued)

(58) Field of Classification Search
CPC ............... G01D 5/353; G01D 5/35303; G01D 5/35306; G01D 5/35332; G01D 5/35335
See application file for complete search history.

(56) References Cited

U.S. PATENT DOCUMENTS 5,555,086 A * 9/1996 vonBieren ......... G01D 5/35383
250/227.27
5,680,489 A 10/1997 Kersey
(Continued)

FOREIGN PATENT DOCUMENTS

CN 103954307 A 7/2014
WO WO2010/136809 A2 12/2010

OTHER PUBLICATIONS

Foster, S., et al., "A Fibre Laser Hydrophone," Proceedings of SPIE 2005;5855:627-630.
(Continued)

*Primary Examiner* — Jonathan Hansen
(74) *Attorney, Agent, or Firm* — Kenealy Vaidya LLP

(57) ABSTRACT

Some embodiments are directed to a multiplexed fiber sensor for a fiber optic hydrophone array, including a signal receiver configured to receive a signal from the fiber optic hydrophone sensor array and an interferometer. The interferometer is configured to produce a first signal component and a second signal component from the signal received from the hydrophone array, and also provided with a first polarization controller configured to control the polarization of the first signal component and a second polarization controller configured to control the polarization of the second signal component. A modulated carrier signal generator configured to generate a modulated carrier signal component based on the first signal component is also provided. A detector configured to output a demodulated output signal from the modulated signal component and the second signal component is included, wherein the modu-
(Continued)

lated signal component and the second signal component output separately from the interferometer.

14 Claims, 2 Drawing Sheets

(51) Int. Cl.
    *G02B 6/42*     (2006.01)
    *H01S 3/10*     (2006.01)
    *H01S 3/067*     (2006.01)
    *H01S 3/094*     (2006.01)
    *H01S 3/16*     (2006.01)

(52) U.S. Cl.
    CPC ......... *G02B 6/4214* (2013.01); *G02B 6/4246* (2013.01); *H01S 3/0675* (2013.01); *H01S 3/094003* (2013.01); *H01S 3/10053* (2013.01); *H01S 3/1608* (2013.01)

(56) References Cited

U.S. PATENT DOCUMENTS

| | | | |
|---|---|---|---|
| 5,946,429 A | | 8/1999 | Huang et al. |
| 6,522,797 B1 * | | 2/2003 | Siems ............... G01H 3/005 |
| | | | 250/227.14 |
| 2010/0098114 A1 | | 4/2010 | DeFreitas et al. |

OTHER PUBLICATIONS

Hill, D. J., et al., "A Fiber Laser Hydrophone Array," Proceedings of SPIE 1999;3860:55-66.
Search Report for Great Britain Patent App. No. GB1500596.0 (dated Jul. 29, 2015).
International Search Report for PCT Patent App. No. PCT/EP2016/050671 (dated Apr. 6, 2016).
Written Opinion for PCT Patent App. No. PCT/EP2016/050671 (dated Apr. 6, 2016).

* cited by examiner

MULTIPLEXED FIBER SENSOR

CROSS REFERENCE TO RELATED APPLICATIONS

This application is a National Phase filing under 35 C.F.R. § 371 of and claims priority to PCT Application No. PCT/EP2016/050671, filed on Jan. 14, 2016, which claims the priority benefit under 35 U.S.C. § 119 of British Application No. 1500596.0, filed on Jan. 14, 2015, the contents of each of which are hereby incorporated in their entireties by reference.

BACKGROUND

Some embodiments relate to a multiplexed fiber sensor, in particular a sensor configured to receive a signal from a hydrophone array and comprising an interferometer and a detector.

For approximately the last 40 years hydrophone arrays based on fiber optic and interferometric technologies have been under consideration. Compared with traditional piezoelectric hydrophones, fiber optic versions offer a number of advantages, including low power consumption, low cost, low weight and improved reliability, as well as low flow noise and insensitivity to EM (electromagnetic) interference. Single-mode fiber laser designs, such as distributed Bragg reflectors (DBR) and distributed feedback (DFB) arrangements have shown promise in detecting environmental perturbations, such as movement underwater. This makes them eminently suitable for use in hydrophone arrays, since such fiber lasers may be configured to show sensitivity to temperature and strain.

A DBR laser is typically formed by placing reflectors at either end of a length of a rare-earth doped fiber, for example, two Bragg gratings with identical reflection wavelengths coupled to an erbium-doped fiber. This sets up a simple etalon structure that with suitable excitation using another light source—"pumping", typically at 980 nm or 1480 nm, causes a Fabry-Perot cavity to lase at a very specific wavelength typically between 1530 nm and 1560 nm, determined by Bragg grating centre wavelength, the length of the cavity and the emission bandwidth of the dopant (erbium). A DFB laser is essentially a simple version of the DBR structure, again forming a simple etalon. Two Bragg gratings are formed within the doped fiber and separated by a short length, which is less than one Bragg wavelength such that a phase step is produced within the length of the grating. Pumping the fiber at, for example, 980 nm again causes the Fabry-Perot cavity to lase at a specific wavelength. Both the DBR and the DFB laser act in the same manner when placed within an acoustic field, since the fiber itself becomes dynamically strained by the acoustic field, causing the Fabry-Perot cavity to change dimension, thus causing a change in wavelength. This change in wavelength can then be sensed using various methods and translated into information regarding the incident acoustic field.

One possibility for determining the wavelength shift and therefore the incident acoustic field effects is to employ an interferometer. In simple terms, an interferometer determines information about waves by superposing them, typically after splitting the incident wave into two and utilising two arms to produce a variation in one of the waves. For example, both the Mach-Zender interferometer and the Michelson interferometer employ amplitude splitting, where a partial reflector is used to divide the amplitude of the incident wave into separate beams which are separated and recombined. This makes such sensors ideal for looking at the wavelength, frequency and phase shifts induced in beams of laser light when a laser cavity undergoes a length change under the influence of an acoustic field.

An example of this is a simple Mach-Zender interferometer (MZI) set up utilised in a wound coil type fiber hydrophone, such as the LWWAA (Light Weight Wide Aperture Array) system sold by Northrup Grumman (2980 Fairview Park Drive, Falls Church, Va. 22042, USA), which employs two wound fiber coils, one acting as a reference mandrel and one as a sensing mandrel. This balances the interferometer and determines the change in wavelength on exposure to an acoustic field. In this case, the interferometer is used as the sensor rather than the readout device. The sensing mandrel is in the sensing zone, that is the region where the acoustic field is incident on the fiber laser array and is sensed. One issue with using the MZI to read such changes directly is that a large path imbalance is required between the arms of the interferometer, which may lead to issues of size constraints in use.

An alternative Mach-Zender system is described in Hill et al., SPIE vol. 3860, pp 55 to 66, 1999, where the interferometer is used to read out the changes in the fiber laser array. The pressure acting on the fiber causes a wavelength change that is proportional to the fractional apparent length change of the laser cavity, which is typically 40-60 mm long length of fiber with gratings at either end. The wavelength shift is converted to a measurable phase shift in a Mach-Zender interferometer with a large path imbalance between the two arms, such that the large path imbalance is in the read-out zone and not the sensing zone. Whilst this offers some advantages over placing the wound coil directly in the sensing zone, introducing such a large path imbalance can lead to issues with signal noise.

A further alternative is to use a Michelson interferometer as the sensor for the hydrophone array, rather than a Mach-Zender interferometer. Such a sensor in conjunction with a DFB laser array is described in Foster et al., SPIE vol. 5855, pp 627-630, 2005. In this case an array of pumped DFB lasers sends a signal to a Michelson interferometer where a splitter/combiner sends signals received from the laser array down one arm containing a delay loop and one arm containing an acoustic-optic modulator (AOM) to generate a phase modulation for a carrier signal. Both arms result in a single output signal that is then sent to a DWDM (dense wavelength division multiplexer) and undergoes demodulation processing to recover the change in wavelength of the fiber lasers due to the incident acoustic field. Faraday mirrors are employed at the end of each interferometer arm, which cause the reflected beams to reverse any polarisation effects on their return to the splitter/combiner used to send the input beams down each arm of the interferometer. This gives optimal signal mixing in the processing stage.

SUMMARY

One disadvantage of this arrangement is that the AOM requires a relatively high power to create the phase modulation, and are rarely 100% efficient. The double pass within the Michelson interferometer also doubles any shift in frequency and any losses associated with the signal. In addition, an RF (radio-frequency) receiver circuit is required for each of the multiplexed channels produced at the DWDM, and either a downmixing stage or a fast analogue-to-digital (ADC) converter to capture the data.

There is therefore a need to be able to find a method in which the output of a hydrophone array can be measured at low power accurately and reliably without needing to employ sizeable sensing equipment, such that the basic advantages of the laser hydrophone array (low power consumption, low cost, low weight and improved reliability) are preserved and enhanced by the sensor chosen.

Some embodiments address these problems by providing a multiplexed fiber sensor comprising: a signal receiver configured to receive a signal from a fiber optic hydrophone sensor array; an interferometer configured to produce a first signal component and a second signal component from the signal received from the hydrophone array, the interferometer provided with a first polarisation controller configured to control the polarisation of the first signal component, a second polarisation controller configured to control the polarisation of the second signal component and a modulated carrier signal generator configured to generate a modulated signal component based on the first signal component; and a detector configured to output a demodulated output signal derived from the modulated signal component and the second signal component; wherein the modulated signal component and the second signal component are output separately from the interferometer.

The use of two separate outputs from the interferometer allows the amplification of the relatively small changes in phase of signal produced when an acoustic field is incident on a laser cavity, and gives enhanced signal noise reduction without having to use increased power consumption whilst still being able to provide signal amplification within the sensor, rather than as part of the hydrophone array. The phase modulation of a single signal component exiting the interferometer gives rise to a simplified demodulation step.

Preferably, the interferometer is a Michelson interferometer.

Preferably, the first polarization controller includes a first Faraday mirror to reflect the first signal component and the second polarisation means includes a second Faraday mirror to reflect the second signal component.

Preferably, the interferometer includes a delay coil and the second Faraday mirror to receive and output the second signal component, and the modulated signal component generator and the first Faraday mirror to receive the first signal component and output the modulated signal component, and a splitter to split the signal received from the hydrophone array into the first signal component and the second signal component.

Preferably, the carrier signal component generator is a phase modulator.

Preferably, the phase modulator includes a fiber-wound piezoelectric cylinder.

Preferably, the interferometer includes two arms, and the phase of one arm of the interferometer is sinusoidally modulated.

Preferably, the hydrophone array includes n hydrophones, where n is greater than one and is preferably between 5 and 50, although the invention has utility beyond this range, e.g. up into the low hundreds of hydrophones.

Preferably, the detector includes a first multiplexer to split the modulated signal into n signal components, a second multiplexer configured to split the second signal component into n second signal components, and n pairs of balanced detectors configured to combine the n modulated components and the n second signal components into n output signals.

Preferably, the first and second multiplexers are arrayed waveguide gratings.

Preferably, the hydrophone array includes an array of pumped fiber lasers.

Preferably the demodulated output signal is derived from a first reference signal and a second reference signal components generated to represent orthogonal versions of the modulated signal and the orthogonal components and second signal components are mixed and undergo an arctan function to produce the demodulated signal.

Preferably, the orthogonal components are of the form $\cos(\sin(wt)+p)$ and $\cos(\cos(wt)+p)$, where k is an interference signal visibility term, A is the amplitude of a drive signal applied to the modulated carrier signal generator, w is the angular frequency of the signal applied to modulated carrier signal generator and p is the phase of the modulated signal.

In another aspect, the present invention provides the use of a multiplexed fiber sensor as described to detect variations in an applied acoustic field.

BRIEF DESCRIPTION OF THE DRAWINGS

The invention will now be described by way of example only, and with reference to the accompanying drawings, in which.

DETAILED DESCRIPTION OF EXEMPLARY EMBODIMENTS

Figure 1:
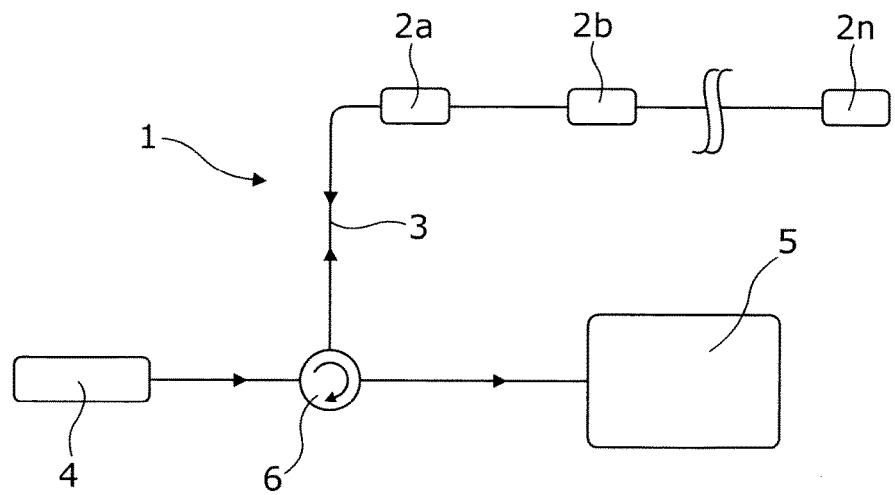
FIG. 1 is a schematic diagram of a laser hydrophone array.

In order to avoid the issues found in the art, the present invention takes the approach of not combining the beams exiting a Michelson interferometer such that they are output separately and using them in combination to generate a phase demodulated signal. As described in more detail below, the multiplexed fiber sensor includes a signal receiver and an interferometer. The signal receiver is configured to receive a signal $S_R$ from a hydrophone fiber sensor array. The interferometer is configured to produce a first signal component $S_1$ and a second signal component $S_2$ from the signal received from the hydrophone array. To do this, the interferometer is provided with a first polarisation controller configured to control the polarisation of the first signal component $S_1$ and a second polarisation controller configured to control the polarisation of the second signal component $S_2$. The interferometer is also provided with a carrier signal $S_c$ generator configured to generate a carrier signal $S_c$ component based on the first signal component $S_1$. The sensor also includes a detector configured to output a demodulated output signal $S_{DMOD}$ derived from the carrier signal $S_c$ component and the second signal component $S_2$. The carrier signal $S_c$ component and the second signal component $S_2$ are output separately from the interferometer FIG. 1 is a schematic diagram of a laser hydrophone array. The hydrophone array 1 includes a plurality of n lasers 2a, 2b . . . 2n, connected by an optical fiber 3. The optical fiber 3 carries light at an excitation wavelength $\lambda_e$ emitted by a pump laser 4 as an input to the lasers 2a, 2b . . . 2n, and also carries back signals received from each of the lasers 2a, 2b . . . 2n, for input to a sensor 5. A circulator 6 is used to direct light from the pump laser 4 to the lasers 2a, 2b . . . 2n, and from the lasers 2a, 2b . . . 2n to the sensor 5. Alternatively, a dichroic splitter may be used. The lasers 2a, 2b . . . 2n are DFB (distributed feedback) lasers formed by doping grating sections provided within the optical fiber 3 with erbium to create a gap corresponding to a π-phase shift. When pumped with light at either 980 nm or 1480 nm (from an IR laser) the Fabry-Perot cavity created lases in the range 1530-1560 nm. In order to give individual, discernible signals, the laser cavities are engineered such that the first laser 2a lases at $\lambda_1$=1530 nm, the second laser 2b lases at $\lambda_2$=1531 nm, and so on, such that the last laser 2n in the array lases at $\lambda_n$=1530+(n−1). This causes a signal $S_R$ to be emitted from the optical fiber 3 back to the circulator 6, where it is passed into the sensor 5. When an acoustic field is incident on the hydrophone array 1, individual laser 2a, 2b . . . 2n cavities undergo various length changes, leading to a phase shift in each individual signal component at the wavelength of the affected laser. This is then detected using the sensor 5.

Figure 2:
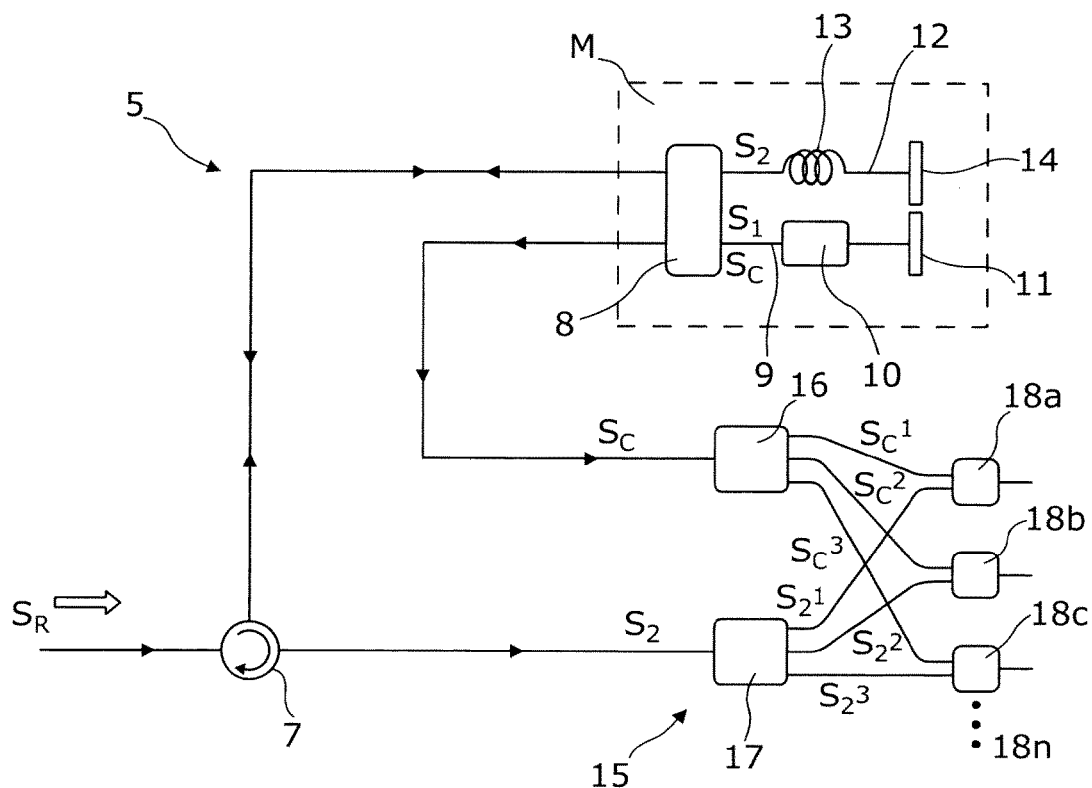
FIG. 2 is a schematic diagram of a multiplexed fiber sensor in accordance with an embodiment of the present invention.

FIG. 2 is a schematic diagram of a multiplexed fiber sensor in accordance with an embodiment of the present invention. The components illustrated in FIG. 2 sit within the sensor 5 illustrated in FIG. 1. The signal $S_R$ received from the hydrophone sensor array 1 arrives as indicated by arrow $S_R$ at a second circulator 7. Here the signal S is sent to a Michelson interferometer M generally indicated by the broken line box. Initially the signal $S_R$ is input into a 2×2 splitter 8 where it is split into a first signal component $S_1$ and a second signal component $S_2$. The 2×2 splitter 8 maintains the polarisation of the signal $S_R$, which may be random on receipt from the hydrophone array 1. The first signal component $S_1$ is then sent down the first arm 9 of the interferometer M, through a phase modulator 10 to a first Faraday mirror 11 where it is reflected back through the phase modulator 10 to the 2×2 splitter 8. The second signal component $S_2$ is sent down the second arm 12 of the interferometer M, through a delay coil 13 to a second Faraday mirror 14 where it is reflected back through the delay coil 13 to the 2×2 splitter 8. The Faraday mirrors 11, 14 are formed from suitable Faraday rotators, such as a cell containing a retroreflective mirror arranged perpendicular to a pair of magnets, where the electro-optic effect created by the application of an application of a magnetic field induces a reversal of polarisation. The use of Faraday mirrors enables polarisation control to be realised passively. The delay coil 13 creates a path imbalance within the interferometer M.

The choice of a Faraday mirror creates a polarisation controller configured to control the polarisation of the signals. When an incident signal of polarisation P is reflected by a Faraday mirror the reflected signal has the equal and opposite polarisation P'. This means that regardless of the random polarisation of the signal S received from the hydrophone array 1 the original polarisation state will always be restored even after passing through the various components, leading to optimal signal mixing. The phase modulator 10 acts as a modulated carrier signal $S_c$ generator, causing a carrier signal $S_c$ to be generated from the first signal component $S_1$. This enables the advantageous use of a simplified phase recovery technique, described below.

The phase modulator 10 is formed from a fiber wound piezoelectric cylinder. A solid cylinder of piezoelectric material, such as quartz, is covered by a number of windings of optical fiber, such that when the piezoelectric material is driven with an applied driving voltage the length of the optical fiber wrapped around the cylinder changes. Driving the phase modulator with a low power simple sine wave causes a resonance within the piezoelectric material of many tens of kHz, creating a sinusoidally modulated carrier signal $S_c$.

Once the second signal component $S_2$ and the modulated signal $S_c$ component have been reflected back along the first 9 and second 12 arm of the interferometer M they are sent back through the 2×2 splitter 8. The second signal component $S_2$ passes back along the path it took from the circulator 7, to the circulator 7 and then is input to a detector system 15 comprising a wavelength demultiplexer 17. The carrier signal $S_c$ component is sent along a separate path directly to the detector system 15 into a wavelength demultiplexer 16. In this manner the modulated signal $S_c$ component and the second signal component $S_2$ are output separately from the interferometer M. In effect, since the interferometer M includes two arms, the phase of one arm of the interferometer M is sinusoidally modulated.

The detector system 15 includes a first multiplexer 16 to split the modulated signal $S_c$ into n carrier components, a second multiplexer 17 configured to split the second signal component $S_2$ into n second signal components $S_2''$ and n detectors 18a, 18b . . . 18n configured to combine the n modulated components, one for each sensor wavelength and the n second signal components $S_2''$ into n output signals. The first 16 and second 17 multiplexers are preferably arrayed waveguide gratings, and the n detectors 18a, 18b . . . 18n are preferably balanced detector pairs that combine the signals differentially. The use of separate input signals to the detector system 15, that is, ensuring that the interferometer M outputs the modulated signal $S_c$ component and the second signal component $S_2$ separately, allows for the generation of DC bias-free detector signals allowing an efficient phase demodulation of the signal S received from the hydrophone array whilst using a simple sinusoidal modulation of the optical path of the modulated signal $S_c$.

The separation of the output signals at the interferometer also leads to increased sensitivity to changes in an acoustic field and reduced signal noise. For example, the individual length of each laser cavity is around 40 nm, hence any fractional change in length due to the actions of an acoustic field will be very small (resulting in a very small wavelength shift). By providing the delay coil 13 of a length many, many times greater than the length of the laser cavity, for example, 40,000 mm, this fractional length change is magnified and hence the change in phase created by the change in laser wavelength is also magnified. However, lasers typically exhibit intensity noise, which is dealt with by sending the second signal component $S_2$ back to the detector separately and multiplexing by a separate AWG 17 for combination as separate components in the balanced detectors 18a, 18b . . . 18n. Furthermore using appropriate processing allows the phase-shift in the signal S received from the hydrophone array 1 when an acoustic field is incident to be raised above the level of the local signal noise. It will be appreciated that other delay coil 13 lengths will also provide utility, such as a length chosen from the range 5 m to 300 m.

Consequently the above embodiment of the present invention contrasts sharply with those in the art where the output of the Michelson interferometer is a single output with the signals from both arms of the interferometer combined. This allows the amplification of the relatively small changes in phase of signal produced when an acoustic field is incident on a laser cavity, and gives enhanced signal noise reduction.

It is also to be expected that the delay length within the interferometer M can pick up acoustic and/or vibrational noise that cannot be distinguished from signals generated at the sensing fiber laser. To allow removal of this, injection of light form an ultra-stable laser at a wavelength separate from the sensing lasers, but in the band available for the wavelength demultiplexer can be arranged to enter the interferometer M. The demodulated signals from that injected wavelength channel will then only contain signals erroneously generated by the delay coil, which can then be subtracted from all other true measurement channels.

In the above embodiment, a fiber wrapped piezoelectric cylinder stretcher is used as a modulated carrier signal generator to generate the modulated signal $S_c$ component. However, other devices may be used, such as a traditional Bragg cell acousto-optic modulator, with appropriate input power increase to ensure that the modulation is sufficient for subsequent signal processing.

One example of a hydrophone array 1 is that as described above, comprising a plurality of pumped fiber lasers, preferably DFB lasers. However, the present invention is equally suited to use with other hydrophone systems, such as those employing DBR lasers. In addition, it is possible to use embodiments of the present invention with other types of hydrophone arrays, such as those where lasers are replaced with Fabry-Perot etalons without doping, which rather than being driven by a pump laser to create a lasing cavity, utilise a laser source to create a phase shift based on the change in length of the cavity under the influence of an acoustic field only. Therefore it should be understood that the type of laser or hydrophone employed for use with the present invention is not limited, and that as long as an optical signal can be created based upon the influence of an acoustic signal the multiplexed fiber sensor described above may be used.

The use of a phase modulator 10 able to be driven using a single sinusoidal wave allows the modulated signal $S_c$ to be driven at much higher frequencies than using the ramp-up techniques used in traditional phase recovery techniques employed in hydrophone arrays such as those described above. For example, it is possible to drive at a frequency of 44.1 kHz, which matches WAV file standard frequencies. The application of this modulation to the recovery of phase information will now be described.

In typical frequency modulation systems the frequency modulated signal recovery technique involves using a lock-in or phase sensitive demodulator to recover phase of frequency information from a modulated signal $S_c$. Effectively this determines the correlation between an input signal and two orthogonal signals generated at the modulated carrier frequency, where the orthogonal signals are a trigonometric in form. The signals returned from any interferometric system when modulated are typically given by a function of the form:

$$1+k\cos(A\sin(wt)+p)$$

where k is the interference signal visibility, A is the amplitude of the drive signal applied to the wound fiber piezoelectric cylinder stretcher, w is the angular frequency of the signal applied to the wound fiber piezoelectric cylinder stretcher and p is the phase of interest of the modulated signal. The differential amplifier output from the detectors is then in the form $$K\cos(A\sin(wt))$$

where K includes an amplifier gain term. The signal is then used to produce the demodulated signal via a modified lock-in amplifier technique that uses representative orthogonal waveforms. This is described further in FIG. 4 below. In effect the demodulated output signal is derived from a first reference signal and a second reference signal components generated to represent orthogonal versions of the modulated signal and the orthogonal components and second signal components are mixed and undergo an arc tan function to produce the demodulated signal. The orthogonal components are of the form $\cos(\sin(wt)+p)$ and $\cos(\cos(wt)+p)$, where k is the interference signal visibility, A is the amplitude of the drive signal applied to the wound fiber piezoelectric cylinder stretcher (the modulated carrier signal generator), w is the angular frequency of the signal applied to the wound fiber piezoelectric cylinder stretcher and p is the phase of interest of the modulated signal.

Figure 3A:
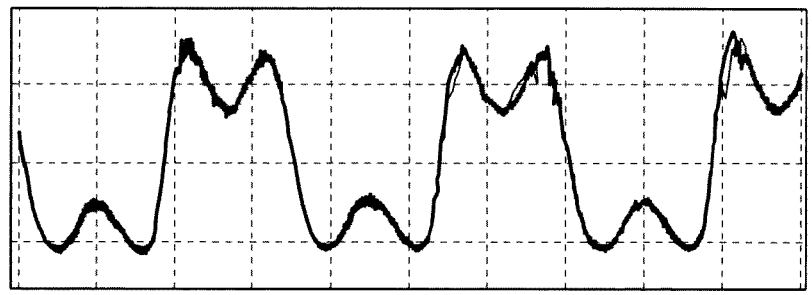
FIG. 3a is an example read out of a measured sinusoidal signal modulation.

When the system is at rest, or near the quadrature point (phase shifted at $\pi/2$), a waveform in the form shown in FIG. 3a is recovered. FIG. 3a is an example read out of a measured sinusoidal signal modulation, where the waveform takes a generally sinusoidal shape (regular peaks and troughs), except at the peak and trough points. At each peak the waveform goes through a local minima, giving each peak the appearance of two smaller peaks spaced apart equally around the local minima. At each trough point the waveform goes through a local maxima, giving each trough the appearance of two smaller troughs spaced apart equally around the local maxima.

Figure 3B:
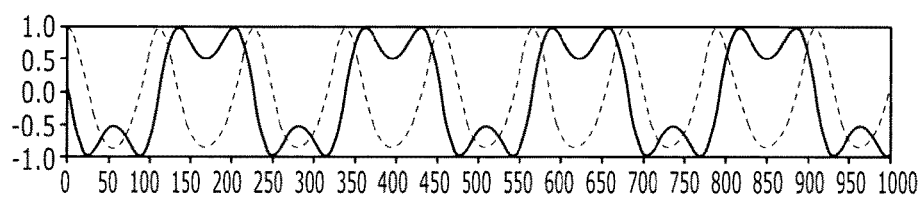
FIG. 3b shows mathematical functions representing interferometer signals resulting from sinusoidal modulation.

FIG. 3b shows mathematical functions representing interferometer signals resulting from sinusoidal modulation. A first signal A corresponds to the sinusoidal modulation signal shown in FIG. 3a for modulation about the quadrature point. A second signal B corresponds to a sinusoidal modulation at a $\pi/2$ shift from the quadrature point, and is a simple cosine function. This type of modulation leads to a modified lock-in or phase sensitive demodulator as shown in FIG. 4.

Figure 4:
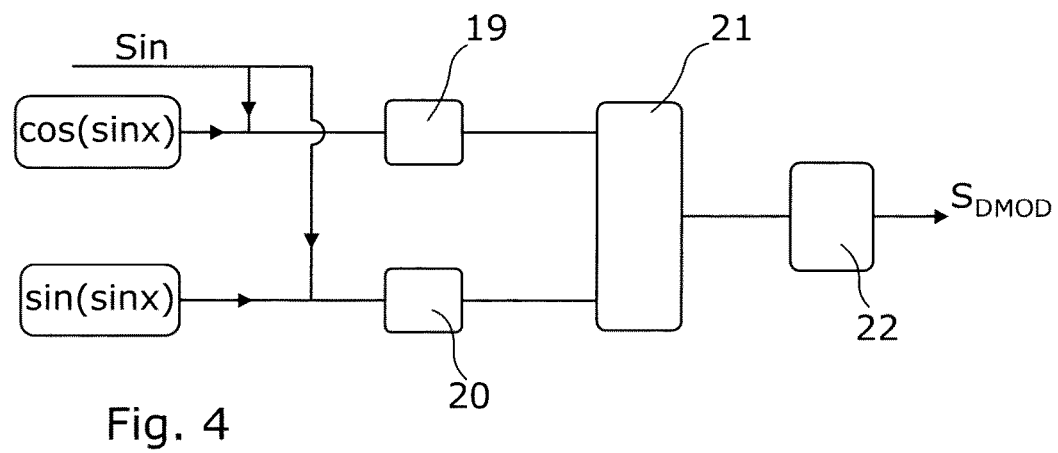
FIG. 4 is a schematic diagram of a signal processing device for use with an embodiment of the present invention.

FIG. 4 is a schematic diagram of a signal processing device for use with an embodiment of the present invention. An input signal $S_{in}$ split into two components is multiplied (mixed) with each of a cosine component and a sine component of a sinusoidally modulated carrier signal $S_c$, $\sin(x)$. The input signal and sine component combination is fed through a first low pass filter 19 and the input signal and cosine component combination is fed a second low pass filter 20, as both combinations include both sum and difference signal components. These then undergo an arctangent transform 21 and a phase unwrap 22 to give a phase demodulated output signal $S_{DMOD}$. Preferably, such a device is used in combination with embodiments of the present invention to derive the phase demodulated signal from the modulated signal $S_c$ and the second signal component $S_2$ produced and output separately by the interferometer M.

These and other embodiments of the present invention will be apparent from the appended claims.

The invention claimed is:
1. A multiplexed fiber sensor comprising:
a signal receiver configured to receive a signal from a fiber optic hydrophone sensor array;
an interferometer configured to produce a first signal component and a second signal component from the signal received from the hydrophone array, the interferometer provided with a first polarization controller configured to control the polarization of the first signal component, a second polarization controller configured to control the polarization of the second signal component and a modulated carrier signal generator configured to generate a modulated carrier signal component based on the first signal component; and
a detector configured to output a demodulated output signal derived from the modulated signal component and the second signal component;

wherein the modulated signal component and the second signal component are output separately from the interferometer.

2. The fiber sensor of claim 1, wherein the interferometer is a Michelson interferometer.

3. The fiber sensor of claim 2, wherein the first polarization controller comprises a first Faraday mirror to reflect the first signal component and the second polarization means comprises a second Faraday mirror to reflect the second signal component.

4. The fiber sensor of claim 3, wherein the interferometer includes a delay coil and the second Faraday mirror to receive and output the second signal component, and the carrier signal component generator and the first Faraday mirror to receive the first signal component and output the modulated signal component, and a splitter to split the signal received from the hydrophone array into the first signal component and the second signal component.

5. The fiber sensor of claim 1, wherein the modulated signal component generator is a phase modulator.

6. The fiber sensor of claim 5, wherein the phase modulator comprises a fiber-wound piezoelectric cylinder.

7. The fiber sensor of any of claim 1, wherein the interferometer comprises two arms, and the phase of one arm of the interferometer is sinusoidally modulated.

8. The fiber sensor of claim 1, wherein the hydrophone array includes n hydrophones.

9. The fiber sensor of claim 8, wherein the detector includes a first multiplexer to split the modulated signal into n signal components, a second multiplexer configured to split the second signal component into n second signal components, and n pairs of balanced detectors configured to combine the n modulated components and the n second signal components into n output signals.

10. The fiber sensor of claim 9, wherein the first and second multiplexers are arrayed waveguide gratings.

11. The fiber sensor of claim 9, wherein the demodulated output signal is derived from a first reference signal and a second reference signal components generated to represent orthogonal versions of the modulated signal and the orthogonal components and second signal components are mixed and undergo an arctan function to produce the demodulated signal.

12. The fiber sensor of claim 11, wherein the orthogonal components are of the form $\cos(\sin(wt)+p)$ and $\cos(\cos(wt)+p)$, where k is an interference signal visibility term, A is the amplitude of a drive signal applied to the modulated carrier signal generator, w is the angular frequency of the signal applied to modulated carrier signal generator and p is the phase of the modulated signal.

13. The fiber sensor of claim 1, wherein the hydrophone array includes an array of pumped fiber lasers.

14. The fiber sensor of claim 1, wherein the modulated signal component generator is a phase modulator, and wherein the interferometer comprises two arms, and the phase of one arm of the interferometer is sinusoidally modulated.

* * * * *